Aug. 25, 1953 W. P. OEHLER ET AL 2,649,725
SPRING PRESSURE DEVICE FOR PLANTING ATTACHMENTS
Filed June 8, 1949 2 Sheets-Sheet 1

INVENTORS.
WILLIAM P. OEHLER
CHARLES H. YOUNGBERG
BY
ATTORNEY

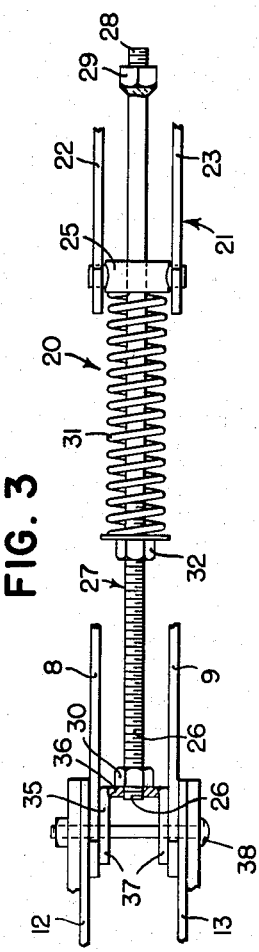

Patented Aug. 25, 1953

2,649,725

UNITED STATES PATENT OFFICE 2,649,725

SPRING PRESSURE DEVICE FOR PLANTING ATTACHMENTS

William P. Oehler and Charles H. Youngberg, Moline, Ill., assignors to Deere & Company, Moline, Ill., a corporation of Illinois Application June 8, 1949, Serial No. 97,732

5 Claims. (Cl. 97—237)

The present invention relates generally to agricultural implements and more particularly to planters and other implements having ground-working tools.

The object and general nature of the present invention is the provision of a new and improved device adapted to act, for example, against a vertically shiftable planting unit for applying downwardly directed pressure thereto or, optionally, for applying upward pressure to the ground-working tool when it is desired to prevent the tool from operating too deep. In a planter, for instance, which is designed to plant either in furrows, in which the soil is quite firm, or on ridges or beds, in which the soil is frequently quite loose, it is quite desirable to have, and the object of the present invention to provide, conveniently operated means for applying either upward pressure or downward pressure, as desired, against the planting unit.

More specifically, it is a feature of the present invention to provide a spring pressure and lift device which is adapted to be placed in one position to act against the ground-working tool for applying downward pressure thereagainst and to be placed in another position in which the device serves to apply upward pressure to permit the tool to float, as when planting on loose beds or the like.

These and other objects and advantages of the present invention will be apparent to those skilled in the art after a consideration of the following detailed description, taken in conjunction with the accompanying drawings, in which:

Figure 2 is a view similar to Figure 1, showing the spring pressure and lift device arranged to apply upward pressure against the furrow-opener unit.

Figure 3 is a fragmentary view taken generally along the line 3—3 of Figure 1.

Figure 1:
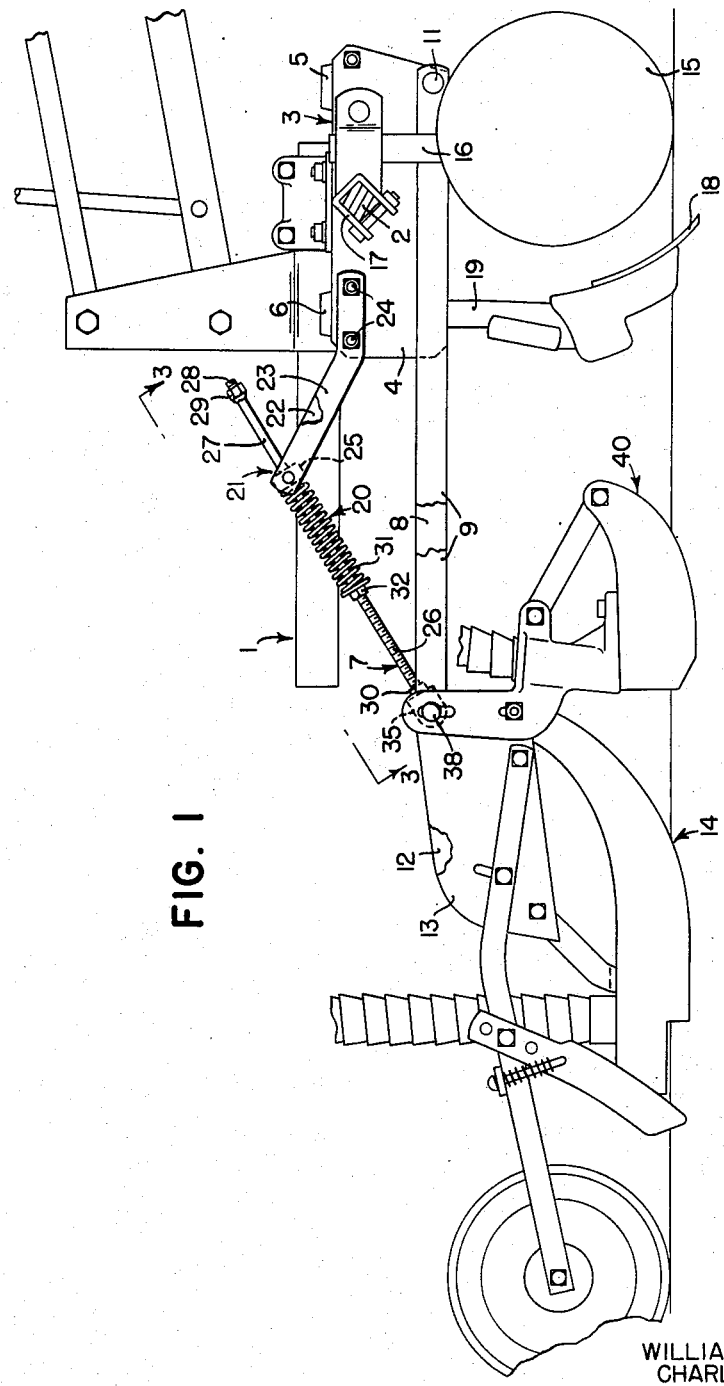
Figure 1 is a fragmentary side view of a planter in which the principles of the present invention have been incorporated, showing the spring pressure and lift device arranged to apply downward pressure against the furrow-opener unit.

Referring first to Figure 1, the reference numeral 1 indicates a pair of tractor-carried rig beams which, in the illustrated form of the invention, receives the planting unit of the present invention. The beams 1 extend generally in a fore and aft direction and are generally arranged in parallelism. A crossbar 2 is fixed by suitable clamping means to the beams 1 and at its central portions carries a support 3 comprising a pair of closely spaced plates 4 and front and rear shank-receiving clamps 5 and 6. An opener unit, indicated in its entirety by the reference numeral 7, is connected with the support 3 and comprises a pair of generally fore and aft extending, laterally spaced forward bars 8 and 9 which are pivoted, as at 11, to the support plates 4. At their rear ends, the bars 8 and 9 are fixed to a pair of vertical spaced apart plates 12 and 13 to which a furrow opener in the form of a runner 14 is connected in any suitable way.

When the furrow-opener unit 7 is arranged to plant in furrows, a pair of furrowing disks 15 are provided at the forward end of the unit. Each disk 15 is connected to the lower end of a shank 16, the upper end of which is fixed to the crossbar 2 by a clamp 17, preferably adjacent the support 3 and at one side thereof. Rearwardly of the furrow-opening disks 15 is a ground-working tool in the form of a shovel 18 carried by suitable means on the lower end of a tool shank 19 which is fixed to the support 3 by the rear clamp 6.

The spring pressure and lift device is indicated in its entirety by the reference numeral 20 and comprises an arm 21 made up of a pair of upwardly and rearwardly extending bars 22 and 23 spaced apart laterally and secured, as by bolts, 24, to the rear portion of the support 3. A swivel member 25 is rockingly mounted in apertures in the rear ends of the bars 22 and 23 and is apertured to slidingly receive an elongated member in the form of a rod 27. One end of the rod is provided with a threaded portion 28 and a wrench-receiving portion 29, preferably hexagonal in section and fixed, as by welding, to the rod 27. The other end of the rod is threaded, as at 26, and receives a lock nut 30. When the parts are arranged as shown in Figure 1, a compression spring 31 is disposed about the rear or lower portion of the rod member 27 and bears at its upper or forward end against the swivel 25 and at its rear end against an abutment in the form of a nut 32 adjustably disposed on the threaded portion 26 at the lower end of the rod member 27. A yoke or bracket 35, preferably in the form of a U-shaped member, is provided with a central tapped portion 36 to receive the threaded end 26 of the rod member 27. The member in the form of a yoke or bracket 35 has end portions 37 which are apertured to receive a pivot bolt 38 which pivotally connects the member 35 to the upper and forward portions of the rear runner frame plates 12 and 13.

When the parts are arranged as shown in Figures 1 and 3, and the adjusting nut 32 properly adjusted, the spring 31 exerts downward pressure through the rod 27 and bracket or yoke 35 against the opener frame 7, the spring reacting at its upper end against the arm or bracket 21 through the swivel 25 against which the upper end of the spring 31 bears, for forcing the furrow opening runner 14, as well as a fertilizer furrow opener 40, in case one is fixed to the runner frame 7, into the ground. By adjusting the nut 32 the amount of compression in the spring 31 may be increased or decreased, and the spring 31 may be caused to exert a greater or a lesser amount of downward pressure.

When the planter is arranged for planting on loose beds or the like, it is desirable not only to remove all downward pressure but in most cases to provide an upwardly exerted pressure against the runner or opener frame so as to prevent the furrow opener from going too deep into the loosened soil. Figure 2 shows the planter arranged for operation under conditions of this kind, and now referring to Figure 2, it will be noted that the disk 15 and their shanks 16 have been reversed on the crossbar 2, the clamps 17 also being reversed so as to occupy a position generally rearwardly of the crossbar 2, thereby providing sufficient room for a sweep shovel 41, the shank 42 of which is now carried in the front clamp 5. Also, the disks 15 have been spaced apart farther than their position shown in Figure 1 and turned so as to throw up a bed or ridge to receive the seed. If necessary, the runner 14 may be provided with gauge shoes 43, also for the purpose of preventing the runner 14 from running too deep into the ground.

In order to apply an upward pressure on the runner frame 7 for operation under the conditions just referred to, the spring pressure and lift device 20 is reversed from its position shown in Figure 1. This is accomplished by first loosening the lock nut 30 and then engaging a wrench with the wrench-receiving sections 29 and unscrewing the rod 27 from the yoke 35. The rod 27 may then be swung to substantially 180° into the position shown in Figure 2, in which the spring 31 is on the upper side of the swivel 25 and, acting against the abutment nut 32, which may be repositioned along the rod member 27 as necessary, the spring 31 is capable of applying an upward pressure against the runner frame 7 by merely screwing the opposite end 28 of the rod member 27 into the yoke or bracket 35. In this position the lock nut 30 prevents the adjusting nut 32 from loosening.

It is to be noted that the runner frame pivots 11 are disposed well forward of the crossbar 2 and in a position below the latter, thereby providing a desirable low hitch point for the runner frame 7. This arrangement is of material importance, as illustrated in Figure 1, in substantially adding to the penetration of the runner 14, particularly when planting in furrows and under similar conditions. Usually, the amount of force exerted by the spring 31 is less when planting on loose beds (Figure 2) than when planting in furrows (Figure 1). Hence, the adjustment nut 32 is preferably run well forward on the rod 27 when the device is adjusted for exerting an upward pressure on the furrow-opener unit.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. For use with planters and other implements having a support and a ground-working tool movable relative thereto: a spring pressure and lift device comprising a bracket adapted to be attached to said support, and a force-applying unit adapted to be connected between said bracket and said tool, comprising an elongated member having attaching means at each end, a swivel member slidably receiving the generally intermediate portion of said elongated member and pivotally connected with said bracket, means connectible with said tool for optionally receiving the attaching means at opposite ends of said elongated member, and a spring member carried by said elongated member and adapted to act between the latter and said swivel member for applying either upward or downward pressure against said tool.

2. For use with planters and other implements having a support and a ground-working tool movable relative thereto: a spring pressure and lift device comprising a bracket attachable to said support, a part attachable to said tool, and a part reversibly connected with said bracket, force-applying means including an elongated member shiftable relative to and reversible relative to said bracket with said reversibly connected part, and means for connecting either end of said elongated member with said first mentioned part for optionally applying upward or downward pressure through said first part against said tool.

3. For use with planters and other implements having a support and a ground-working tool movable relative thereto: a spring pressure and lift device comprising a bracket attachable to said support, a second bracket attachable to said tool, an elongated member swivelly and shiftably connected with said first bracket, means for detachably connecting either end of said elongated member with said second bracket, and a spring acting between said first bracket and said elongated member for applying downward pressure against said tool when one end of said elongated member is fastened to said second bracket and for applying upward pressure through said elongated member against said tool when the other end of said elongated member is connected with said second bracket.

4. For use with planters and other implements having a support and a ground-working tool movable relative thereto: a spring pressure and lift device comprising an arm adapted to be fixed to said support, an elongated member shiftably and swingably connected with the outer end of said arm, a spring disposed about one portion of said elongated member and acting between the latter and said arm, and cooperating interengaging means on each end of said elongated member and said tool for optionally connecting either end of said elongated member with said tool.

5. For use with planters and other implements having a support and a ground-working tool movable relative thereto, a spring pressure and lift device comprising a bracket attachable to said support, an apertured member swiveled to said bracket, an elongated member shiftable through said apertured member, a threaded section on each end of said elongated member, a member having a tapped section adapted to be pivotally connected to said tool, said tapped section receiving either one or the other of the threaded sections of said elongated member, and the apertured member being swingable through 180° to provide for bringing either end of said elongated member into a position for connection to said tapped member, an adjustable abutment on one end of said elongated member, and a spring acting between said apertured member and said abutment in either position of said elongated member.

WILLIAM P. OEHLER.
CHARLES H. YOUNGBERG.

References Cited in the file of this patent

UNITED STATES PATENTS

| Number | Name | Date |
| --- | --- | --- |
| 1,044,532 | Johnson | Nov. 19, 1912 |
| 1,695,512 | Sturrock | Dec. 18, 1928 |
| 2,297,299 | Graham et al. | Sept. 29, 1942 |
| 2,318,205 | Drennan | May 4, 1943 |
| 2,328,174 | Silver | Aug. 31, 1943 |
| 2,443,042 | Kreigbaum | June 8, 1948 |